(12) United States Patent
Narroschke et al.

(10) Patent No.: US 9,749,660 B2
(45) Date of Patent: Aug. 29, 2017

(54) ADAPTIVE CODING OF A PREDICTION ERROR IN HYBRID VIDEO CODING

(76) Inventors: Matthias Narroschke, Schaafheim (DE); Hans-Georg Musmann, Salzgitter (DE)

( * ) Notice: Subject to any disclaimer, the term of this patent is extended or adjusted under 35 U.S.C. 154(b) by 1341 days.

(21) Appl. No.: 12/160,418

(22) PCT Filed: Dec. 22, 2006

(86) PCT No.: PCT/EP2006/012492
§ 371 (c)(1),
(2), (4) Date: Nov. 1, 2010

(87) PCT Pub. No.: WO2007/079964
PCT Pub. Date: Jul. 19, 2007

(65) Prior Publication Data
US 2011/0038410 A1   Feb. 17, 2011

Related U.S. Application Data

(60) Provisional application No. 60/766,300, filed on Jan. 9, 2006.

(51) Int. Cl.
H04B 1/66   (2006.01)
H04N 7/12   (2006.01)
(Continued)

(52) U.S. Cl.
CPC ........... *H04N 19/65* (2014.11); *H04N 19/103* (2014.11); *H04N 19/12* (2014.11); *H04N 19/124* (2014.11);
(Continued)

(58) Field of Classification Search
CPC ....... H04N 19/00175; H04N 19/00036; H04N 19/00042; H04N 19/00781;
(Continued)

(56) References Cited

U.S. PATENT DOCUMENTS 5,253,056 A * 10/1993 Puri et al. ................ 375/240.01
2002/0015513 A1 * 2/2002 Ando et al. .................. 382/107
(Continued)

FOREIGN PATENT DOCUMENTS

JP         64-36173 A       2/1989
JP      2003250157 A       9/2003

OTHER PUBLICATIONS

Narroschke, "Adaptive coding of the prediction error for H.264/AVC," *Institut für Informationsverarbeitung Universität Hannover*, 15 pages, 2005, http://itg32.hhi.de/docs/ITG312_UH_05_2_151.pdf, accessed Jul. 20, 2011.
(Continued)

*Primary Examiner* — Frederick Bailey
*Assistant Examiner* — Farhan Mahmud
(74) *Attorney, Agent, or Firm* — Seed IP Law Group LLP

(57) ABSTRACT

The present invention relates to a method for coding a video signal using hybrid coding, comprising: reducing temporal redundancy by block based motion compensated prediction in order to establish a prediction error signal, deciding whether to transform the prediction error signal into the frequency domain, or to maintain the prediction error signal in the spatial domain for encoding.

20 Claims, 5 Drawing Sheets

Figure 1:
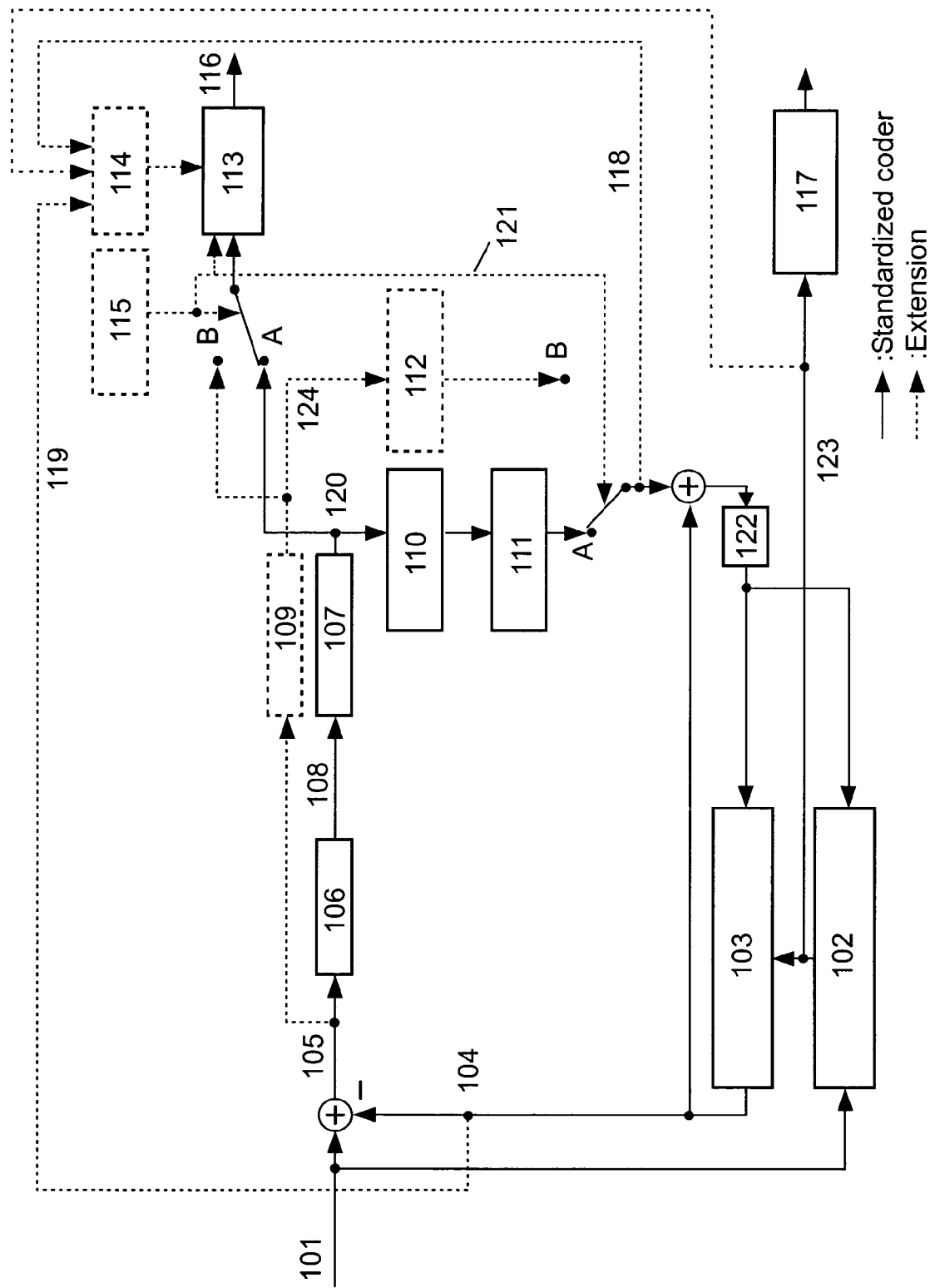

(51) Int. Cl.

| | | |
|---|---|---|
| *H04N 11/02* | (2006.01) | |
| *H04N 11/04* | (2006.01) | |
| *H04N 19/65* | (2014.01) | |
| *H04N 19/147* | (2014.01) | |
| *H04N 19/46* | (2014.01) | |
| *H04N 19/13* | (2014.01) | |
| *H04N 19/129* | (2014.01) | |
| *H04N 19/61* | (2014.01) | |
| *H04N 19/12* | (2014.01) | |
| *H04N 19/124* | (2014.01) | |
| *H04N 19/70* | (2014.01) | |
| *H04N 19/103* | (2014.01) | |
| *H04N 19/126* | (2014.01) | |
| *H04N 19/167* | (2014.01) | |
| *H04N 19/176* | (2014.01) | |
| *H04N 19/43* | (2014.01) | |
| *H04N 19/44* | (2014.01) | |
| *H04N 19/52* | (2014.01) | |

(52) U.S. Cl.
CPC ......... *H04N 19/126* (2014.11); *H04N 19/129* (2014.11); *H04N 19/13* (2014.11); *H04N 19/147* (2014.11); *H04N 19/167* (2014.11); *H04N 19/176* (2014.11); *H04N 19/43* (2014.11); *H04N 19/44* (2014.11); *H04N 19/46* (2014.11); *H04N 19/52* (2014.11); *H04N 19/61* (2014.11); *H04N 19/70* (2014.11)

(58) Field of Classification Search
CPC ......... H04N 19/00121; H04N 19/0003; H04N 19/00533; H04N 19/0009; H04N 7/50; G06F 17/147

USPC .................................................. 375/240.03
See application file for complete search history.

(56) References Cited

U.S. PATENT DOCUMENTS

| | | | |
|---|---|---|---|
| 2003/0128753 A1 | 7/2003 | Lee et al. | |
| 2004/0008898 A1* | 1/2004 | Song et al. | 382/250 |
| 2005/0168470 A1* | 8/2005 | Prabhakar et al. | 345/531 |
| 2005/0196062 A1* | 9/2005 | Cho et al. | 382/240 |
| 2005/0276493 A1* | 12/2005 | Xin et al. | 382/239 |
| 2006/0013300 A1* | 1/2006 | Han | 375/240.03 |
| 2006/0088222 A1* | 4/2006 | Han et al. | 382/232 |

OTHER PUBLICATIONS

Narroschke, "Extending the prediction error coder of H.264/AVC by a vector quantizer," in *Proceedings of SPIE Visual Communications and Imaging Processing*, vol. 5960, Jul. 12, 2005, 12 pages, ftp://ftp.tnt.uni-hannover.de/pub/papers/2005/VCIP-MN-BEIJING.pdf, accessed Jul. 20, 2011.

Recommendation ITU-R BT.601-7, "Studio encoding parameters of digital television for standard 4:3 and wide-screen 16:9 aspect ratios," BT Series Broadcasting service (television), International Telecommunication Union (ITU-R), Mar. 2011, 19 pages.

Narroschke, "Adaptive prediction error coding in the spatial and frequency domain in the KTA reference model," International Organisation for Standardisation: Coding of Moving Pictures and Audio, Apr. 2006, Montreux, CH, 15 pages.

\* cited by examiner 2,1,0,-1,0,0,0,0,0,0,0,0,0,0,0,0

Fig.3

ADAPTIVE CODING OF A PREDICTION ERROR IN HYBRID VIDEO CODING

The invention relates to a method of coding and decoding, a coder and a decoder, and data signals using adaptive coding of the prediction error.

Up to date standardized video coding methods are based on hybrid coding. Hybrid coding provides a coding step in the time domain and a coding step in the spatial domain. First, the temporal redundancy of video signals is reduced by using a block based motion compensated prediction between the image block to be coded and a reference block from an image that has already been transmitted determined by a motion vector. The remaining prediction error samples are arranged in blocks and are transformed into the frequency domain resulting in a block of coefficients. These coefficients are quantised and scanned according to a fixed and well-known zigzag scanning scheme, which starts with the coefficient representing the DC value. According to a typical representation, this coefficient is positioned among the low frequency coefficients in the top left corner of a block. The zigzag scanning produces a one-dimensional array of coefficients, which are entropy-coded by a subsequent coder. The coder is optimised for an array of coefficients with decreasing energy. Since the order of coefficients within a block is predetermined and fixed, the zigzag scanning produces an array of coefficients of decreasing energy, if the prediction error samples are correlated. The subsequent coding step may then be optimised for such a situation. For this purpose, the latest standard H.264/AVC proposes Context-Based Adaptive Binary Arithmetic Coding (CABAC) or Context-Adaptive Variable-Length Coding (CAVLC). However, the coding efficiency of the transform only is high, if the prediction error samples are correlated. For samples being only marginally correlated in the spatial domain, the transform is less efficient.

It is an object of the present invention to provide a coding and decoding method, respective coders and decoders, data signals as well as corresponding systems and semantics for coding and decoding video signals being more efficient than the prior art.

According to an aspect of the present invention, a method for coding a video signal is provided being based on hybrid coding. The method comprises the steps of reducing temporal redundancy by block based motion compensated prediction in order to establish a prediction error signal, and deciding whether to transform the prediction error signal into the frequency domain, or to maintain the prediction error signal in the spatial domain.

According to a corresponding aspect of the present invention, a coder is provided, which is adapted to apply hybrid coding of a video signal. The coder includes means for reducing the temporal redundancy by block based motion compensated prediction in order to establish a prediction error signal, and means for deciding whether to transform the prediction error signal into the frequency domain, or to maintain the prediction error signal in the spatial domain. According to this aspect of the invention, a concept and corresponding apparatuses, signals and semantics are provided to decide adaptively whether to process the prediction error signal in the frequency or in the spatial domain. If the prediction error samples have only small correlation, the subsequent steps of coding the samples may be more efficient and they would lead to a reduced data rate compared to coding the coefficients in the frequency domain. Therefore, an adaptive deciding step and adaptive control means to make the decision are implemented by the present invention. Accordingly, in view of the prediction error signal, it is decided whether to use frequency domain transform or to maintain the prediction error signal in the spatial domain. The subsequent coding mechanisms may be the same as for the frequency domain, or they may be adapted especially to the needs of the samples in the spatial domain.

According to another aspect of the invention, the method for coding a video signal, and in particular the deciding step is based on a cost function. Generally, the decision whether to use the coefficients in the frequency domain or the samples in the spatial domain may be based on various kinds of deciding mechanisms. The decision may be made for all samples within a specific portion of a video signal at once, or e.g. even for a specific number of blocks, macroblocks, or slices. The decision may be based on a cost function, as for example a Lagrange function. The costs are calculated for both, coding in the frequency domain and coding in the spatial domain. The decision is made for the coding with lower costs.

According to another aspect of the present invention, the cost function includes the rate distortion costs for the coding in the spatial and in the frequency domain. According to still another aspect of the invention, the rate distortion costs may be calculated by the required rate and the resulting distortion weighted by a Lagrange parameter. Further, the distortion measure may be the mean square quantisation error or the mean absolute quantisation error.

According to an aspect of the present invention, the samples in the spatial domain may be coded by essentially the same methods as being used for the coefficients in the frequency domain. These methods may include the CABAC or CAVLC coding methods. Accordingly, only little or no adaption of the coding mechanisms is necessary, if the adaptive control means decide to switch between the frequency and the spatial domain. However, it might also be provided to use different coding schemes for the coefficients in the two domains.

According to another aspect of the invention, a method for coding a video signal is provided, which is based on hybrid coding. According to this aspect of the invention, the temporal redundancy is reduced by block based motion compensated prediction, and the samples of the prediction error signal are provided in the prediction error block in the spatial domain. The samples are scanned from the prediction error block in order to provide an array of samples in a specific order. According to this aspect of the invention it is provided that the scanning scheme is derived from a prediction error image or a prediction image. The scanning scheme according to this aspect of the invention takes account of the effect that the zigzag scan according to prior art for the frequency domain may not be the most efficient scanning order for the spatial domain. Therefore, an adaptive scanning scheme is provided, which takes account of the distribution of the samples and the magnitude of the samples in the spatial domain. The scanning scheme may preferably be based on a prediction error image or a prediction image. This aspect of the invention takes account of the most probable positions of the samples having the highest magnitude and samples being most probably zero. As the coding gain for the frequency domain is mainly based on the phenomenon that the low frequency components have larger magnitudes, and most of the high frequency coefficients are zero, a very effective, variable code length coding scheme like CABAC or CAVLC may be applied. However, in the spatial domain, the samples having the highest magnitude may be located anywhere within a block. However, as the prediction error is usually the highest at the edges of a moving object, the prediction image or the prediction error image may be used to establish the most efficient scanning order.

According to an aspect of the present invention, the gradients of the prediction image may be used to identify the samples with large magnitudes. The scanning order follows the gradients within the prediction image in their order of magnitude. The same scanning order is then applied to the prediction error image, i.e. the samples in the prediction error image in the spatial domain.

Further, according to still another aspect of the present invention, the scanning scheme may be based on a motion vector in combination with the prediction error image of the reference block. The scan follows the magnitudes of the prediction error in decreasing order.

According to one aspect of the invention, the scanning scheme is derived from a linearcombination of the gradient of the prediction image and the prediction error image of the reference block in combination with a motion vector According to another aspect of the present invention, a specific code for the coding mechanisms, as for example CABAC or the like is used based on separately determined probabilities for the coefficients in the frequency domain or the samples in the spatial domain. Accordingly, the well-known prior art coding mechanisms may be adapted at least slightly in order to provide the most efficient coding mechanism for the spatial domain. Accordingly, the switching mechanism being adaptively controlled in order to code either in the spatial or in the frequency domain may be further adapted to switch the subsequent coding steps for the samples or coefficients in the respective domains.

According to an aspect of the present invention, a method for coding a video signal is provided including a step of quantising the prediction error samples in the spatial domain by a quantiser, which has either subjectively weighted quantitation error optimisation or mean squared quantization error optimization. According to this aspect of the invention, the quantiser used for quantising the samples in the spatial domain may be adapted to take account of the subjectively optimal visual impression of a picture. The representative levels and decision thresholds of a quantiser may then be adapted based on corresponding subjective or statistical properties of the prediction error signal.

Further, the present invention relates also to a decoding method and a decoding apparatus in accordance with the aspects set out here above. According to an aspect of the present invention, a decoder is provided including adaptive control means for adaptively deciding whether an input stream of a coded video signal represents the prediction error signal of the coded video signal in the spatial domain or in the frequency domain. Accordingly, the decoder according to this aspect of the present invention is adapted to decide for an incoming data stream, i.e. whether the prediction error signal is coded in the frequency or in the spatial domain. Further, the decoder provides respective decoding means for each of the two domains, either the spatial or the frequency domain.

Further, according to still another aspect of the present invention, the decoder comprises a scan control unit for providing a scanning order based on a prediction signal or a prediction error signal. The scan control unit according to this aspect of the invention is adapted to retrieve the necessary information about the scanning order, in which the incoming samples of a block have been scanned during coding the video signals. Further, the decoder may comprise all means in order to inverse quantise and inverse transform the coefficients in the frequency domain or to inverse quantise the samples in the spatial domain. The decoder may also include a mechanism to provide motion compensation and decoding. Basically, the decoder may be configured to provide all means in order to implement the method steps corresponding to the coding steps explained here above.

According to still another aspect of the present invention, a data signal representing a coded video signal is provided, wherein the coded information of the prediction error signal in the data signal is partially coded in the spatial domain and partially coded in the frequency domain. This aspect of the invention relates to the coded video signal, which is a result of the coding mechanisms as set out above.

Further, according to still another aspect of the invention, the data signal may include side information indicating the domain in which a slice, a macroblock, or a block is coded, in particular information whether a slice, a macroblock or a block is coded in the spatial or in the frequency domain. As the adaptive control according to the present invention provides that the prediction error signal is either coded in the spatial domain or in the frequency domain, it is necessary to include corresponding information into the coded video signal. Therefore, the present invention provides also a specific information, which indicates the domain in which the specific portion, such as a slice, macroblock, or block has been coded.

Further, this aspect of the invention takes also account of the possibility that a whole macroblock or a whole slice may be coded only in one of the two domains. So, if for example an entire macroblock is coded in the spatial domain, this may be indicated by a single flag or the like. Further, even a whole slice may be coded only in the frequency or in the spatial domain, and a corresponding indicator could be included for the whole slice into the data stream. This results in a decreased data rate and a more efficient coding mechanism for the side information.

The aspects of the present invention are explained with respect to the preferred embodiments which are elucidated by reference to the accompanying drawings.

Figure 2:
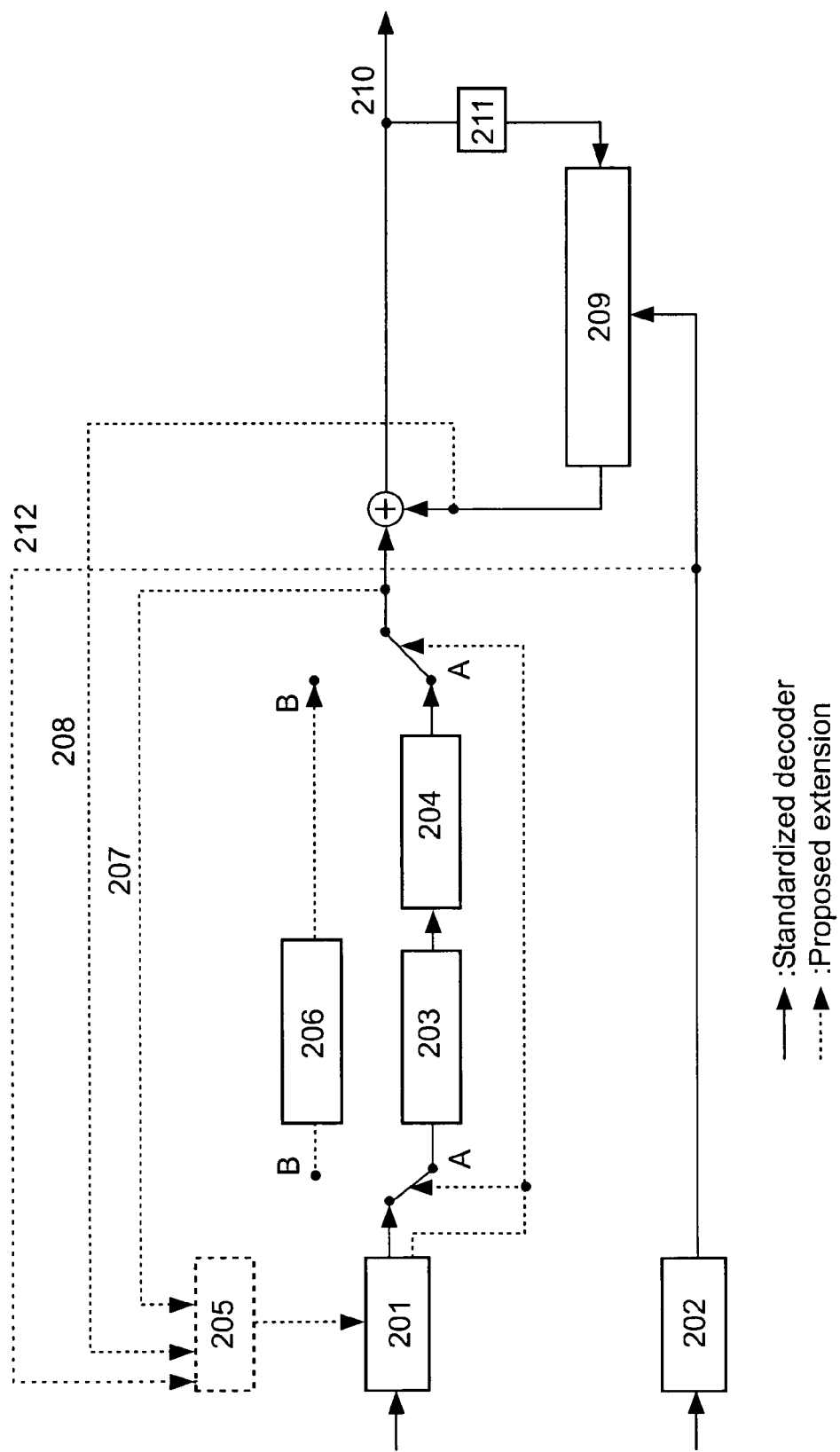
Figure 3:
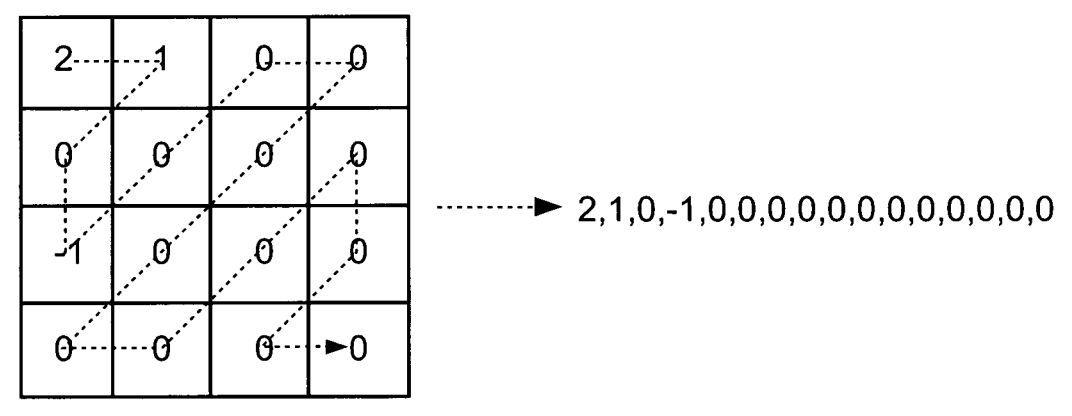
Figures 4, 5:
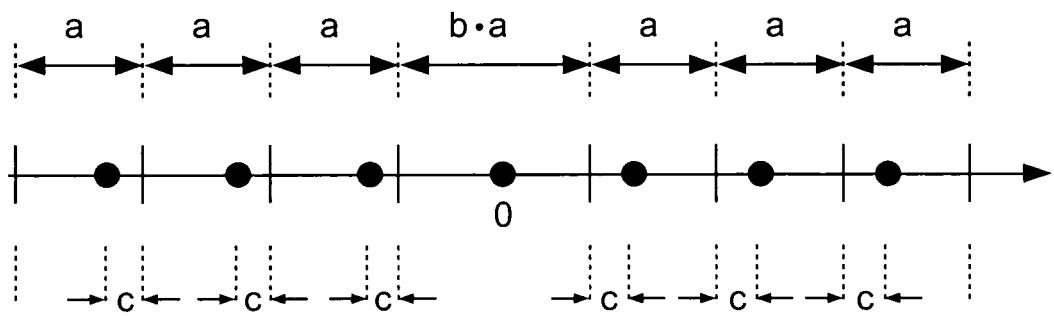
Figure 6:
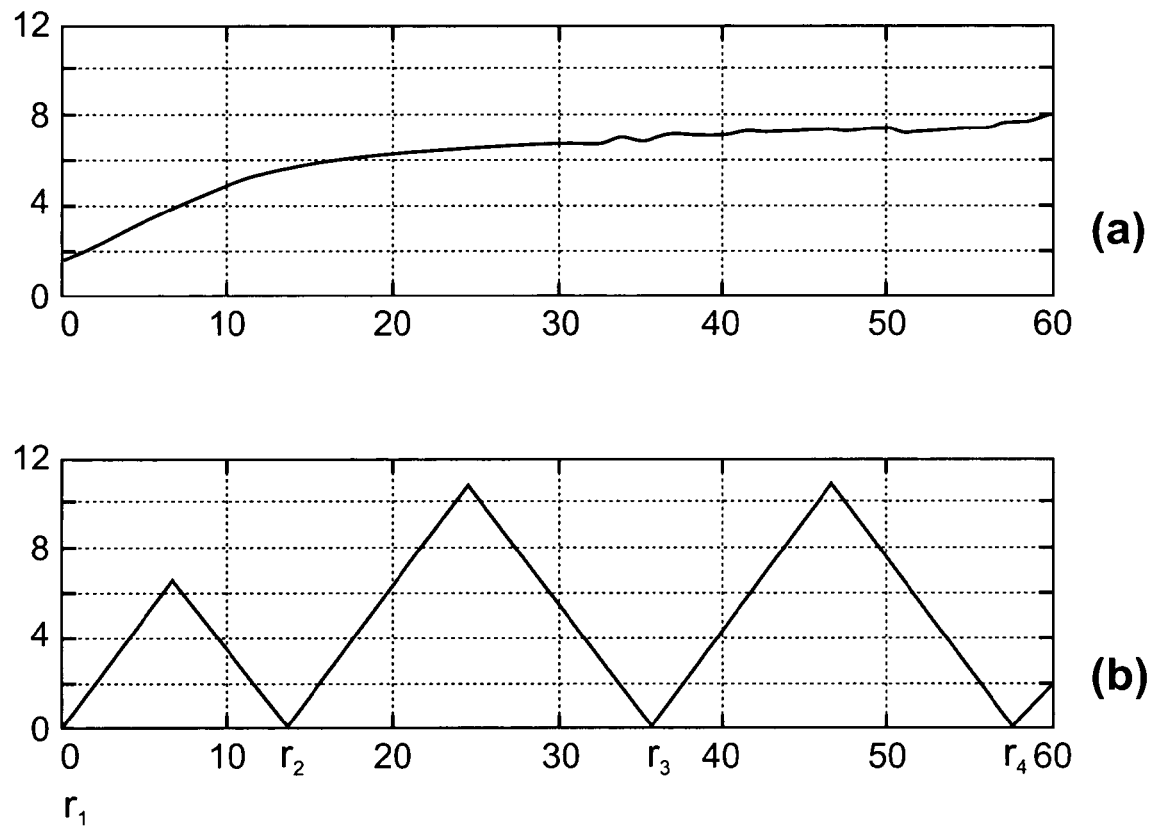

FIG. 1 shows a simplified block diagram of an encoder implementing aspects according to the present invention, FIG. 2 shows a simplified block diagram of a decoder implementing aspects of the present invention, FIG. 3 shows a scanning scheme according to the prior art, FIG. 4 shows scanning schemes according to the present invention, FIG. 5 illustrates the parameters used for an optimised quantiser according to the present invention; and FIG. 6 shows a simplified representation of the measured mean absolute reconstruction error of a picture element in the case of the subjectively weighted quantisation in the frequency domain in FIG. 6(*a*) and in the spatial domain in FIG. 6(*b*).

FIG. 1 shows a simplified block diagram of an encoder according to the present invention. Accordingly, the input signal 101 undergoes a motion estimation based on which a motion compensation prediction is carried out in order to provide a prediction signal 104, which is subtracted from the input signal 101. The resulting prediction error signal 105 is transformed into the frequency domain 106 and quantised by an optimised quantiser 107 for the frequency related coefficients. The output signal 120 of the quantiser 107 is passed to an entropy coder 113 which provides the output signal 116 to be transmitted, stored, or the like. By means of an inverse quantisation block 110 and inverse transformation block 111, the quantised prediction error signal 120 is further used for the next prediction step in the motion compensated prediction block 103. The inverse quantised an inverse DCT transformed prediction error signal is added to the prediction signal and passed to frame memory 122 storing preceding images for the motion compensation prediction block 103 and the motion estimation block 102. Generally, the present invention suggests to use in addition to the prior art an adaptively controlled mechanism 115 to switch between the frequency and the spatial domain for transforming the prediction error signal 105. The adaptive control means 115 produce signals and parameters in order to control the adaptive change between the frequency and the spatial domain. Accordingly, an adaptive control information signal 121 is asserted to the two switches switching between the positions A and B. If the transformation is carried out in the frequency domain, the two switches are in position A. If the spatial domain is used, the switches are switched to position B. Further, the side information signal 121, i.e. which of the domains has been used for the coding procedure of a picture is also passed to the entropy coder 113. Accordingly, an appropriate information for the device is included into the data stream. Parallel to the frequency transform, via an alternative path, the prediction error signal 105 is passed to the quantiser 109. This quantisation block 109 provides optimised quantisation for the prediction error signal 105 in the spatial domain. The quantised prediction error signal 124 in the spatial domain may be passed to a second inverse quantisation block 112 and further to the back connection to the motion compensation prediction block 103. Additionally, there is a scan control block 114 receiving either the motion vector 123 and the inverse quantised prediction error signal 118, or the prediction signal 104 via connection 119. Block 117 serves to encode the motion information.

The adaption control block 115 decides whether a block is to be coded in the frequency or in the spatial domain, and it generates corresponding side information to indicate the domain. The decision made by the adaption control means is based on the rate distortion costs for the coding in the spatial and for coding in the frequency domain. The domain having the lower rate distortion costs is selected for coding. For example, the rate distortion costs C are calculated by the required rate R and the resulting distortion D weighted by a Lagrange parameter L: C=L*R+D. As a distortion measure, the mean squared quantisation error may be used, but also other measures are applicable, as for example the mean absolute quantisation error. As Lagrange parameter L, the commonly used Lagrange parameter for the coder control of H.264/AVC may be used $L=0.85*2^{((QP-12)/3)}$. Alternative methods for determining the rate distortion costs are possible.

The adaption control 115 can alternatively control the coding method. This may be done for example based on the prediction signal or based on the correlation in the prediction error, or based on the domain, the prediction error is coded in at a motion compensated position of already transmitted frames.

FIG. 2 shows a simplified block diagram of an architecture of a decoder according to aspects of the present invention. Accordingly, the coded video data is input to two entropy decoding blocks 201 and 202. The entropy decoding block 202 decodes motion compensation information, such as motion vectors etc. The entropy decoding block 201 applies the inverse coding mechanism used in the coder, as for example decoding according to CABAC or CAVLC. If the encoder uses a different coding mechanism for the coefficients or the samples in the spatial domain, the corresponding decoding mechanism is to be used in the corresponding entropy decoding blocks. Accordingly, the entropy decoding block 201 produces the appropriate signals in order to switch between positions A and B in order to use either the appropriate inverse quantisation path for the spatial domain, i.e. the inverse quantisation operation block 206, or the appropriate blocks according to switch position A, i.e. the inverse quantisation block 203 and the inverse transform block 204. If the prediction error is represented in the frequency domain, inverse quantisation block 203 and inverse transformation block 204 apply the corresponding inverse operations. As the samples in the spatial domain have been arranged in a specific order in accordance with a scan mechanism according to aspects of the present invention, a scan control unit 205 provides the correct order of the samples for the entropy decoding block 201. If the encoding has been carried out in the spatial domain, the inverse transform block 204 and the inverse quantization block 203 are bypassed by an inverse quantisation operation in block 206. The switching mechanism, to switch between frequency and spatial domain (i.e. position A and B of the switches) is controlled by the side information sent in the bitstream and decoded by the entropy decoding block 201. Further, the inverse quantised signal in the spatial domain, or the inverse quantized and inverse transformed signal in the frequency domain are summed with the motion compensated prediction picture in order to provide the decoded video signals 210. The motion compensation is carried out in block 209 based on previously decoded video signal data (previous pictures) and motion vectors. The scan control unit 205 uses either the prediction image 208, or the prediction error signal 207 in combination with the motion vector 212 to determine the correct scan sequence of the coefficients. The scan mechanism may also be based on both pictures, i.e. the prediction error picture and the prediction picture. As explained for the coding mechanism with respect to FIG. 1, the scan sequence during coding may be based on a combination of the prediction error information 207 and the motion compensation vectors. Accordingly, the motion compensation vectors may be passed via a path 212 to the scan control unit 205. Further, in correspondence to FIG. 1, there is a frame memory 211 storing the necessary and previously decoded pictures.

FIG. 3 shows a simplified diagram in order to illustrate the zigzag scan order according to the prior art. Accordingly, the coefficients, which are the result of a transform to the frequency domain (for example DCT) are arranged in a predetermined order as shown in FIG. 3 for a four by four block. These coefficients are read out in a specific order, such that the coefficients representing the low frequency portions are located in the first left positions of a one-dimensional array. The more on the bottom right of the array, the higher the corresponding frequencies of the coefficients. As blocks to be coded often contain substantial low frequency coefficients, the high frequency coefficients, or at least a majority of high frequency coefficients are zero. This situation can effectively be used to reduce the data to transmit it by for example replacing large sequence of zeros by a single information about the number of zeros.

FIG. 4 shows a simplified illustrative example for a scan mechanism according to an aspect of the present invention. FIG. 4(*a*) shows the magnitude of the gradients in the prediction image for one block. The values in each position of the block represent the gradient of the prediction image of the current block. The gradient itself is a vector consisting of a two components representing the gradient in horizontal and vertical direction. Each component may be determined by the difference of the two neighboring samples or it may be determined by the well-known Sobel-operator taking six neighboring samples into account. The magnitude of the gradient is the magnitude of the vector. If two values have the same magnitude, a fixed or predetermined scan order may be applied. The scanning order follows the magnitude of the gradient values in the block as indicated by the dotted line. Once the scanning order within the gradient prediction image is established, the same scanning order is applied to the quantised prediction error samples, which are shown in FIG. 4(b). If the quantised samples in the spatial domain of the block shown in FIG. 4(b) are arranged in a one-dimensional array as indicated on the left side of FIG. 4(b) in accordance with the scanning order established based on the magnitude of the gradients in the prediction image, the samples having a high value are typically arranged first in the array, i.e. in the left positions. The right positions are filled with zeros as indicated in FIG. 4(b).

Instead of a scan controlled by the gradient, also other scans as e.g. a predefined scan or a scan controlled by the quantised prediction error of already transmitted frames in combination with a motion vector, or combinations thereof can be applied (the scan control relates to blocks 114 or 205 as explained with respect to FIG. 1 and FIG. 2). In the case of a scan controlled by the prediction error signal in combination with a motion vector, the scan follows the magnitudes of the quantized prediction error samples of the block, the motion vector of the current block refers to, in decreasing order.

If the motion vector points to fractional sample positions, the required quantized prediction error samples may be determined using an interpolation technique. This may be the same interpolation technique as used for the interpolation of the reference image in order to generate the prediction samples.

In the case the scan is controlled by the combination of the prediction image and the prediction error image in combination with a motion vector, linear combinations of the magnitudes of the gradients and of the quantized prediction error samples of the block, the motion vector of the current block refers to, are calculated. The scan follows the values of these linear combinations. In addition, the method for the scan determination can be signalled for segments of the sequence, e.g. for each frame or for each slice or for a group of blocks. According to the typical standard processing, the motion compensation vectors are already considered, while the prediction image is determined.

According to another aspect of the present invention, the scanning order may also be based on the prediction error picture in combination with a motion vector. Further, combinations of the gradient principle as explained above and the prediction error picture are conceivable.

FIG. 5 shows a simplified illustration being useful to illustrate the definition of an optimised quantiser according to aspects of the present invention. Accordingly, the three parameters a, b, and c are the parameters used to adapt the quantiser. According to the standard H.264/AVC, rate distortion optimised quantisers for the coefficients with two different distortion measures are applied. The first measure is the mean squared quantisation error, the second is the subjectively weighted quantisation error. According to the H.264/AVC standard, two quantisers for the prediction error samples are developed. Since the distribution of the prediction error is close to a Laplacian distribution, scalar a dead-zone plus uniform threshold quantiser is used in the case of mean squared quantisation error optimisation. FIG. 5 illustrates the parameters a, b, and c of the quantisation and inverse quantisation.

Table 1 shows the parameters a, b, and c, which may be advantageously used for the commonly used QPs (Quantisation Parameter) in the H.264/AVC coding scheme. The parameters a, b, c are the respective optimised parameters for mean square quantisation error optimisation. However, this is only an example, and different or additional parameters may be useful for different applications.

TABLE 1

| QP | Mean squared quantisation error optimisation | | | Subjectively weighted quantisation error optimisation | | | | |
|---|---|---|---|---|---|---|---|---|
| | a | b | c | $r_1$ | $r_2$ | $r_3$ | $r_4$ | $r_5$ |
| 23 | 9.6 | 1.6 | 2.7 | 0 | 11 | 28 | 46 | 66 |
| 26 | 14.8 | 1.4 | 4.8 | 0 | 14 | 36 | 58 | 110 |
| 29 | 22.2 | 1.4 | 6.9 | 0 | 20 | 54 | 92 | 148 |
| 32 | 30.2 | 1.4 | 9.3 | 0 | 28 | 76 | 130 | 220 |

For subjectively weighted quantisation error optimisation, a non-uniform quantiser is proposed with representative levels $r_i$, $-r_i$ and decision thresholds in the middle of adjacent $r_i$, which are also shown in table 1. If large prediction errors occur at the edges, visual masking may be exploited. Accordingly, large quantisation errors may be allowed at the edges and small ones if the image signal is flat. H.264/AVC may use more than 4 QPs as shown in Table 1. Then Table 1 has to be extended. H.264/AVC may use 52 different QPs. The basic idea for determining the appropriate representative values $r_i$, $-r_i$, is explained here below with respect to FIG. 6.

FIG. 6 shows a simplified representation of the measured mean absolute reconstruction error of a picture element in the case of the subjectively weighted quantisation in the frequency domain in FIG. 6(a) and in the spatial domain in FIG. 6(b). The measured mean absolute reconstruction error of subjectively weighted quantisation in the frequency domain is shown as a function of the absolute value of the prediction error. For the absolute reconstruction error of subjectively weighted quantisation in the spatial domain, the representation levels $r_i$, are adjusted such that the mean absolute reconstruction error is the same for quantisation in the frequency and spatial domain with respect to the quantisation intervals in the spatial domain. Just as an example, the values $r_1$, $r_2$, $r_3$, and $r_4$ for QP=26 as indicated in table 1 are also present in FIG. 6(b). As a rule of thumb, a representative levels $r_i$ is approximately doubled if the value QP increases by 6. The quantiser design can also exploit other features of the visual system. Furthermore, quantisers can be used to create a quantisation error with properties different to those of the H.264/AVC quantisers.

Entropy Coding of the Quantised Samples in the Spatial Domain

According to an aspect of the present invention, entropy coding in the spatial domain may be based on the same methods as for the quantised coefficients in the frequency domain. For the H.264/AVC standard, two preferred entropy coding methods are CABAC and CAVLC. However, according to this aspect of the present invention, instead of coding the quantised coefficients in the frequency domain, quantised samples in the spatial domain are coded by the above mentioned methods. As explained above, the scanning order may be changed in order to provide the same data reduction as for the frequency domain. As set out above, the scan in the spatial domain may be controlled by the magnitude of the gradient of the prediction image signal at the same spatial position. According to this principle, the samples to be coded are arranged in an order of decrease in gradients, as already explained with respect to FIGS. 4(a) and (b). Other scan mechanisms may also be applied as set out above. Further, separate codes, which means separate probability models in the case of CABAC, may be used for the spatial domain according to aspects of the present invention. The code and in the case of CABAC the initialisation of the probability models may be derived from the statistics of the quantised samples. The context modelling in the spatial domain may be done in the same way as in the frequency domain.

Coding of the Side Information

The adaptive control means explained with respect to FIG. 1 generates the information relating to the domain, in which a block is to be coded. The block size may be four by four or eight by eight picture elements according to the size of the transform. However, according to different aspects of the present invention, other block sizes independent of the size of the transform may be applied. According to an aspect of the present invention, the side information includes specific flags, which indicate whether the coding mechanism has adaptively been changed during coding. If for example all blocks of a slice are coded in the frequency domain, this may be indicated by a specific bit in the coded video data signal. This aspect of the invention may also relate to the blocks of a macroblock, which may all be coded in each of the two domains, or only in one domain. Further, the concept according to the present aspect of the invention may be applied to macroblocks and information may be included in the data stream which indicates whether at least one block of a macroblock is coded in the spatial domain. Accordingly, the flag Slice_FD_SD_coding_flag may be used to indicate whether all blocks of the current slice are coded in the frequency domain, or whether at least one block is coded in the spatial domain. This flag may be coded by a single bit. If at least one block of the slice is coded in the spatial domain, this may be indicated by the flag MB_FD_SD_coding_flag for each individual macroblock of the current slice, if all the blocks of the current macroblock are coded in the frequency domain, or if at least one block is coded in the spatial domain. This flag may be coded conditioned on the flags of the already coded neighbouring blocks to the top and to the left. If the last one of a macroblock is coded in the spatial domain, this may be indicated by the flag FD_or_SD-Flag for each block of the macroblock to be coded, if the current block is coded in the frequency or in the spatial domain. This flag may be coded conditioned on the flags of the already coded neighbouring blocks to the top and to the left. Alternatively, the side information may also be coded conditioned by the prediction signal or the prediction error signal in combination with a motion vector.

Syntax and Semantics

According to this aspect of the present invention, an exemplary syntax and semantics allowing the incorporation of the aspects of the present invention into the H.264/AVC coding scheme is presented. Accordingly, the flag Slice_FD_SD_coding_flag may be introduced in the slice_header as shown in table 2. The flag MB_FD_SD_coding_flag may be sent in each macroblock_layer as shown in table 3. In the residual_block_cabac it may be signalled by the flag FD_or_SD_flag if the frequency domain coding or spatial domain coding is supplied for the current block, this is shown in table 4 here below. A similar scheme may be applied in other video coding algorithms for the prediction error coding.

TABLE 2

| slice_header( ){ | C | Descriptor |
|---|---|---|
| . | | |
| . | | |
| . | | |
| Slice_FD_SD_coding_flag | 2 | u(1) |
| . | | |
| . | | |
| . | | |

TABLE 3

| Macroblock_layer( ){ | C | Descriptor |
|---|---|---|
| . | | |
| . | | |
| . | | |
| If (Slice_FD_SD_coding_flag == 1){ | | |
| MD_FD_SD_coding_flag | 2 | u(1), ae(v) |
| { | | |
| . | | |
| . | | |
| . | | |

TABLE 4

| residual_block_cabac{ | C | Descriptor |
|---|---|---|
| . | | |
| . | | |
| If (Slice_FD_SD_coding_flag == 1 && MB_FD_SD_Coding_flag == 1){ | | |
| FD_or_SD_flag | 3/4 | u(1), ae(v) |
| If (FD_or_SD_flag == 1)} | | |
| Code_Prediction_error_in_spatial_domain | | |
| } | | |
| else{ | | |
| Code_Prediction_error_in_frequency_domain | | |
| } | | |
| } | | |
| . | | |
| . | | |
| . | | |

The invention claimed is:

1. A method, comprising:
   coding a video signal using hybrid coding, the coding including:
   reducing temporal redundancy by block based motion compensated prediction in order to establish a prediction error signal,
   deciding whether to transform the prediction error signal into a transformed signal in the frequency domain,
   transforming the prediction error signal into the transformed signal and encoding the transformed signal in response to deciding to transform the prediction error signal into a transformed signal in the frequency domain encoding, and
   encoding the prediction error signal in the spatial domain in response to deciding not to transform the prediction error signal into the transformed signal in the frequency domain.

2. The method according to claim 1, wherein the step of deciding is based on a cost function.

3. The method according to claim 2, wherein the cost function includes rate distortion costs for coding in the spatial domain and coding in the frequency domain.

4. The method according to claim 3, wherein the rate distortion costs are calculated by a desired rate and a resulting distortion weighted by a Lagrange parameter.

5. The method according to claim 4, wherein the distortion includes a mean square quantization error or a mean absolute quantization error.

6. The method according to claim 1, further comprising:
encoding samples of the prediction error signal in the spatial domain; and
encoding coefficients of the transformed signal using a same method as used for encoding the samples of the prediction error signal in the spatial domain.

7. The method of claim 6, wherein the encoding of the coefficients is carried out according to CABAC or CAVLC.

8. The method according to claim 7, wherein encoding samples of the prediction error signal in the spatial domain includes using a specific CABAC code having separate probabilities for the spatial domain, and/or a specific CAVLC code.

9. The method of claim 1, wherein encoding the prediction error signal in the spatial domain:
providing a samples of the prediction error signal in a prediction error block in the spatial domain,
deriving a scanning scheme from a prediction error image or a prediction image for the video signal, and
scanning the samples in the prediction error block to provide an array of samples in a specific order according to the scanning scheme derived from the prediction error image or prediction image.

10. The method of claim 9, wherein deriving the scanning scheme includes at least one of:
deriving the scanning scheme from a gradient of the prediction image,
deriving the scanning scheme based on a motion vector in combination with the prediction error image of a reference block, and
deriving the scanning scheme from a linear combination of the gradient of the prediction image and the prediction error image of the reference block in combination with a motion vector.

11. The method of claim 9, comprising quantizing the samples of the prediction error signal by a quantizer having subjectively weighted quantization error optimization or mean squared quantization error optimization in the spatial domain.

12. A non-transitory computer readable medium including instructions that cause one or more computers to implement a method comprising:
producing a coded video signal that includes coded information of a prediction error signal, the producing including:
partially coding the prediction error signal in the spatial domain, and
partially coding the prediction error signal in the frequency domain.

13. The non-transitory computer readable medium according to claim 12, wherein the producing included producing information relating to the domain in which a slice, a macroblock, or a block is coded, in particular information whether a slice, macroblock, or block is coded in the spatial or in the frequency domain.

14. The non-transitory computer readable medium of claim 13, comprising a slice_fd_sd_coding_flag, a mb_fd_sd_coding_flag, and/or a fd_or_sd_flag information relating to the coding used for a slice, a macroblock, or a block, respectively.

15. A method for decoding a video signal using hybrid decoding, comprising:
receiving coded video data that includes coded frequency domain data samples and coded spatial domain data samples,
for each coded video data sample of plural coded video data samples of the received coded video data, determining whether the coded video data sample is a coded frequency domain data sample or a coded spatial domain data sample,
in response to determining that the coded video data sample is a coded frequency domain data sample, transforming and decoding the coded video data sample into a transformed decoded spatial domain data sample, and
in response to determining that the coded video data sample is a coded spatial domain data sample, decoding the coded spatial domain data sample without performing a transform of the coded spatial domain data into the spatial domain.

16. The decoding method of claim 15, wherein the decoding including assigning positions of prediction error signal samples, received in a one-dimensional array, to locations in a two-dimensional arrangement, the locations in the two-dimensional arrangement being determined based on a previously received prediction error signal or prediction image.

17. The decoding method of claim 15, wherein receiving the coded video data includes coded video data that that has been coded using a method that includes:
coding a video signal using hybrid coding, the coding including:
reducing temporal redundancy by block based motion compensated prediction in order to establish a prediction error signal,
deciding whether to transform the prediction error signal into a transformed signal in the frequency domain,
transforming the predicting error signal into the transformed signal and encoding the transformed signal in response to deciding to transform the prediction error signal into a transformed signal in the frequency domain encoding, and
encoding the prediction error signal in the spatial domain in response to deciding not to transform the prediction error signal into the transformed signal in the frequency domain.

18. A coder for coding a video signal using hybrid coding, comprising:
means for reducing temporal redundancy by block based motion compensated prediction and establishing a prediction error signal, and
adaptive control means for deciding whether to transform the prediction error signal into a transformed signal in the frequency domain, transforming the prediction error signal into the transformed signal and encoding the transformed signal in response to deciding to transform the prediction error signal into a transformed signal in the frequency domain encoding, and encoding the prediction error signal in the spatial domain in response to deciding not to transform the prediction error signal into the transformed signal in the frequency domain.

19. A decoding device, comprising:
adaptive control means for adaptively deciding whether a coded video data sample of a coded video signal is a coded frequency domain data sample or a coded spatial domain data sample; and decoding means for:
- transforming and decoding the coded video data sample into a transformed decoded spatial domain data sample in response to determining that the coded video data sample is a coded frequency domain data sample; and
- decoding the coded spatial domain data sample without performing a transform of the coded spatial domain data into the spatial domain in response to determining that the coded video data sample is a coded spatial domain data sample.

20. The decoder of claim 19 comprising further scanning control means for providing a scanning order based on a prediction signal or a prediction error signal or on a linear combination of both.

* * * * *